Feb. 15, 1949.    J. R. ESTES    2,461,885
LATCHING MEANS FOR TRACTOR HITCH BARS
Filed Sept. 7, 1946

INVENTOR.
JOSEPH RUSSELL ESTES
BY *Flournoy Corey*
ATTORNEY.

Patented Feb. 15, 1949

2,461,885

UNITED STATES PATENT OFFICE 2,461,885

LATCHING MEANS FOR TRACTOR HITCH BARS

Joseph Russell Estes, Cedar Rapids, Iowa

Application September 7, 1946, Serial No. 695,463

3 Claims. (Cl. 280—33.44)

This invention relates to tractors and tractor equipment and has particular relation to a latching means for such tractors.

Several of the well known makes of tractors employ a hitch bar which is permitted to swivel and in which pins, chains, and the like, are employed as locking means for permitting the hitch bar to be rotatably and removably secured in place on the tractor.

These devices have a disadvantage that the hitch bar rotates when not in use and this destroys or injures the fastening means.

At other times, as for instance in pulling equipment by means of a ball hitch, the drag of the load is off center of the axis of the draw bar and the bar must be rigidly held in substantially horizontal position to permit full functioning of the ball hitch.

It is therefore one of the main objects of my invention to provide a new and improved latching means for selectively preventing or permitting rotation of a hitch bar.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

Figure 1:
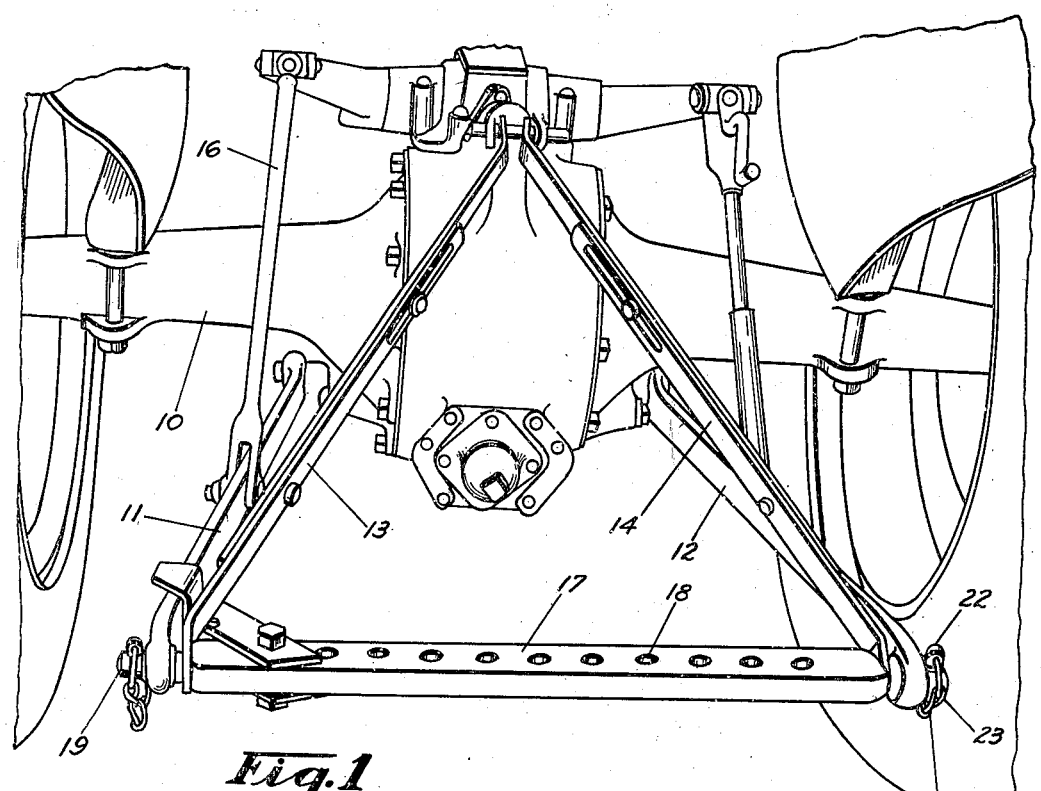
Figure 1 is a view in perspective of the rear end of a tractor on which a hitch bar, constructed in accordance with one embodiment of my invention, has been mounted. The latching means is shown in an engaged position.
Figure 3:
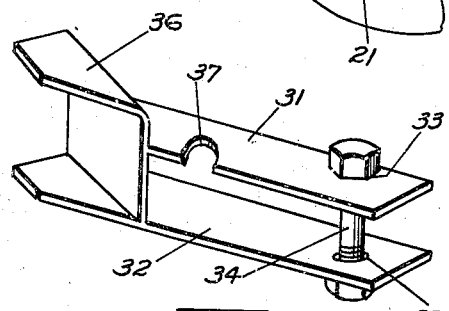
Figure 3 is a view also in perspective showing the latching means.

Referring to said drawings; a device constructed in accordance with my invention is adapted to be mounted on a tractor such as illustrated at 10. The tractor here shown is provided with a pair of rearwardly extending rigid arms 11 and 12, and a pair of adjustable braces 13 and 14. In this particular instance the arms 11 and 12 may be raised and lowered by means of a hydraulic device which acts through rod 16 to raise and lower the arms.

A hitch bar 17, consisting of an elongated bar having a series of openings 18 therethrough, is pivotally received in corresponding ends of members 11 and 13, and 12 and 14, by means of stub shafts, indicated at 19 and 21, and in locking the bar in place locking pins 22 are passed through suitable openings in the outer ends of the stub shafts 19 and 21, and chains 23 are employed for preventing the pins from becoming lost.

In use of the tractor when the hitch bar is not being used, the bar tends to spin and soon breaks the pins 23 and the pins 22 are lost. While these members can be replaced, it is an aggravating and sometimes expensive operation to properly replace these members.

To overcome these disadvantages I provide a latching means, which, in the present embodiment, employs a pair of parallel extending plates 31 and 32 having openings 33 at one end thereof to receive a bolt 34 by which the arms 31 and 32 may be pivotally secured to any desired opening 18 in hitch bar 17. The projecting ends of the bars 31 and 32 are provided with a channel member 36 adapted to engage the arm 11 of the tractor. In this manner the spinning of the hitch bar 17 may be prevented.

Figure 2:
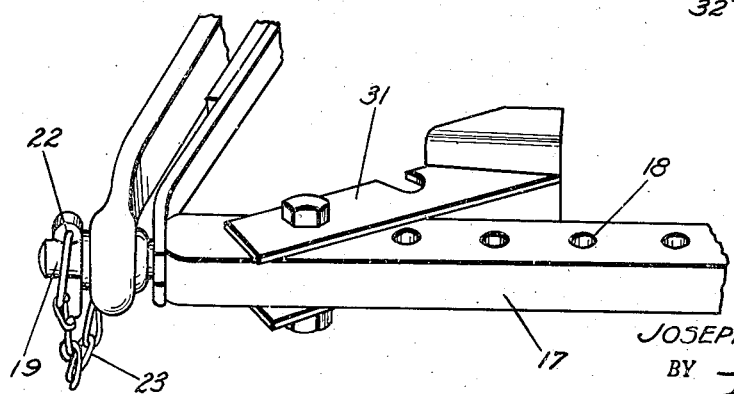
Figure 2 is a partial view in perspective illustrating the hitch bar shown in Figure 1 in its unlatched or disengaged position.

When it is desirable to attach machinery to the hitch bar 17, the latching means may be swung to the disengaged position shown in Figure 2 and the bar 17 will pivot freely. The upper bar 31 is preferably notched as illustrated at 37 to permit it to partially engage and be received over the brace 13.

It is apparent that I have provided a latching means which will selectively hold a draw bar in a selected position, as for instance when drawing loads whose drag is off center with respect to the axis of the draw bar or permitting rotation of the bar as desired.

Although I have described a specific embodiment of my invention, it is apparent that modifications thereof may be made by those skilled in the art. Such modifications may be made without departing from the spirit and scope of my invention as set forth in the appended claims.

I claim as my invention:

1. A latching means for use with and for selectively preventing rotation of a rotatable tractor hitch bar, comprising an arm pivotally engaged to the hitch bar, and having yoke means on the free end thereof for selective swingable engagement or disengagement with a portion of the hitch bar supporting structure.

2. A draw bar, a latching means comprising a pair of parallel plates, a means for pivotally engaging two adjacent ends of the parallel members to the draw bar, and a channel member secured to the free ends of the bar members in angular relations thereto and with the ears of the channel projecting outwardly and angularly therefrom to engage a supporting member of the draw bar structure.

3. For use in combination with a tractor hitch bar of the type pivotally mounted adjacent its ends for rotation about its longitudinal axis, a latching means for preventing rotation of the hitch bar comprising an arm, means attaching the arm to the hitch bar for pivotal movement about an axis generally at right angles to the longitudinal axis of the hitch bar, and a yoke-like member projecting laterally outwardly from the free end of said arm and adapted for selective engagement with a portion of the hitch bar supporting structure.

JOSEPH RUSSELL ESTES.

REFERENCES CITED

The following references are of record in the file of this patent:

UNITED STATES PATENTS

| Number | Name | Date |
|---|---|---|
| 1,715,682 | Starks | Jan. 4, 1929 |
| 2,392,903 | Currie | Jan. 15, 1946 |